United States Patent Office 3,440,292
Patented Apr. 22, 1969

3,440,292
HYDROXYMETHYL-TERMINATED POLYMERS
Henry C. Allen, Decatur, Ala., assignor to the United States of America as represented by the Secretary of the Army
No Drawing. Continuation-in-part of application Ser. No. 275,466, Apr. 24, 1963. This application Dec. 23, 1963, Ser. No. 332,981
Int. Cl. C08g 22/16; C07c 33/02, 33/10
U.S. Cl. 260—633                                    10 Claims This application is a continuation-in-part of Ser. No. 275,466 filed Apr. 24, 1963 and now abandoned.

The invention described herein may be manufactured and used by or for the Government for governmental purposes without the payment of any royalty thereon.

This invention relates to hydroxymethyl-terminated polymers. Particularly, the invention relates to hydroxymethyl-terminated 1,4-addition polymers of the conjugated dienes.

Polymers and copolymers of the conjugated dienes are of many different types. The basic structure of these polymers and copolymers is dependent upon their method of preparation and, as the properties of any given polymer or copolymer depends upon its basic structure, the method of preparation also determines many of their chemical and physical properties.

It follows, therefore, that the properties of a conjugated diene polymer are, in a large part, a function of the method of preparation. For example, a polydiene rubber in which the structural units are predominantly of the 1,2- or 3,4-addition type (referred to as vinyl addition) exhibits mechanical properties much different than a predominantly 1,4-addition polydiene rubber. However, as the basic structure of the 1,4-addition product can exist as either the cis or trans stereoisomers, the properties of a given 1,4-addition polymer further depend upon the relative proportions of these two isomers in the product.

As an example, stereoregular polydienes in the trans-1,4-configuration are so highly crystalline at ordinary temperatures that they have little of the characteristics of rubber, while the stereoregular cis-1,4 configuration in a polydiene makes an excellent rubber down to a very low temperature. From the foregoing, it should be apparent that through the variation of the relative amounts of the cis form, the trans form, and the vinyl addition form, many polydiene configurations are possible which are completely different from one another.

The differences in the basic structure (and thus properties) of the polydienes as a result of their method of preparation become even more critical when it is desired to include functional substituents in the polymer chain for purposes of chain extension and crosslinking. Ionic and stereospecific polymerization initiators are highly reactive substances which are incompatible with many functional groups which are desirable for chain extension and crosslinking. Moreover, introduction of the functional groups is difficult from the point of locating the groups at specifically desired positions in the chain. As an illustration, the copolymerization of acrylic acid with butadiene to obtain the carboxy function on the polymer chain can only be accomplished through a free radical mechanism. This results in a copolymer with carboxy substituents randomly located on the chain. About the most reasonable definition of the structure which can be attributed to such a copolymer is that it is a copolymer of a given amount of butadiene and a given amount of acrylic acid prepared by a free radical mechanism. Many other similar examples arising out of attempts to include functional groups on the chains of polymers and copolymers of the conjugated dienes are familiar to those skilled in the art.

The compositions of the instant invention are liquid hydroxymethyl-terminated 1,4-addition copolymers of the conjugated dienes, the compositions generally having an average molecular weight of about 2,000 to about 10,000. Moreover, these polymers have the basic structural characteristics of free-radical initiated polymerization products of the conjugated dienes, that is, predominantly 1,4-addition with varying amounts of cis and trans configuration. The amount of cis and trans form in the polymer depend chiefly on the temperatures employed in the synthesis of the carboxy-terminated polymer from which the hydroxymethyl-terminated polymers are prepared by reducing the carboxy groups to hydroxymethyl groups with lithium aluminum hydride (LAH). The carboxy and hydroxymethyl groups are located only at the terminal positions of the chain.

No polydiene of the type having the 1,4-addition structure and terminal hydroxymethyl groups are known in the prior art. Schoenberg (Journal of Polymer Science, vol. 49, pp. S9–S11) and others have prepared hydroxy-terminated polydienes through the use of alkali metal initiators in polar solvents, but these polymers were predominantly of the vinyl addition structure characteristic of that type of polymerization reaction. The polymers and copolymers of the present invention, however, cannot be made using alkali metal polymerization initiators. The prior art also discloses a copolymer of butadiene and allyl alcohol thus obtaining a hydroxy containing polydiene with the desired free-radical initiated structure (i.e. 1,4-addition structure), but with random positioning of the hydroxy groups (Marvel et al., Journal American Chemical Society, vol. 77, pp. 177–178). Again, this copolymer is completely different from the polymers and copolymer of the present invention since the hydroxy groups are located only on the two terminal carbon atoms of the chain.

The polymers of the instant invention are especially suitable for use in solid rocket propellant formulations as polymeric binders when they are cured with diisocyanate curing agents to yield the urethane linkage.

In accordance with the foregoing, it is an object of the invention to provide liquid hydroxymethyl-terminated polymers and copolymers.

A further object of the instant invention is to provide liquid hydroxymethyl-terminated polymers and copolymers of the conjugated dienes.

Another object of the present invention is to provide liquid hydroxymethyl-terminated polymers and copolymers of the conjugated dienes, these polymers and copolymers having a molecular weight of about 2,000 to about 10,000.

A still further object of the invention is to provide hydroxymethyl-terminated polymers and copolymers of the conjugated dienes, these polymers and copolymers being especially suitable as polymeric binders in the formulation of solid rocket propellants when cured with organic diisocyanates.

The manner in which these as well as other objects can be accomplished will become apparent from the following detailed description.

Any conjugated diene monomer containing no functional group subject to reduction with LAH and which undergoes 1,4-addition reactions is suitable for use as a starting material in preparing the hydroxymethyl-terminated polymers and copolymers of the invention. These diene monomers corresponds to the structural Formula I

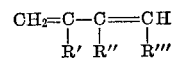

wherein the variables R', R", and R''' are each selected from the group of hydrogen; lower alkyl such as methyl, ethyl, propyl, and butyl; lower alkoxy as exemplified by methoxy and ethoxy; aryl typified by phenyl; lower alkyl substituted aryl such as xylyl and tolyl; lower alkoxy substituted aryl illustrated by methoxyphenyl and ethoxyphenyl; halo substituted aryl such as p-chlorophenyl and 2,3-dibromophenyl; aralkyl exemplified by benzyl and phenethyl; and halogen such as chloro, bromo, iodo and fluoro. Illustrative of this general group of dienes are 1,3-butadiene; 1,3-pentadiene; 1,3-hexadiene; 2-methyl-1,3-butadiene; 2,3-dimethyl-1,3-butadiene; 2-chloro-1,3-butadiene; 2-phenyl-1,3-butadiene; 2,3-dimethyl-1,3-hexadiene; 2-methoxy-3-ethyl-butadiene-1,3; 2-benzyl-1,3-butadiene; 2-ethoxy-3-ethyl-1,3-hexadiene; and the like. The variables R', R'', and R''' are preferably hydrogen, lower alkyl, or halo groups.

The compositions contemplated by the invention correspond to structural Formula II

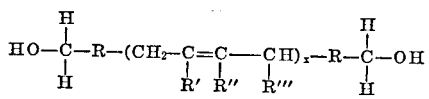

wherein $x$ is a positive whole number greater than one. The only limit to $x$ is that it cannot be so large that the composition is a solid. In other words, the unit

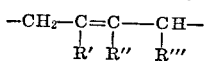

can be repeated any desired number of times as long as the composition remains a liquid at those temperatures generally used in formulating propellants, that is, temperatures of about 20° C. to about 100° C. Generally the value of $x$ will be such that the molecular weight of the chain will be from about 2,000 to about 10,000 and preferably from about 3,000 to about 5,000. R is selected from the group consisting of hexamethylene, pentamethylene, and tetramethylene; R', R'', and R''' are each groups as defined hereinabove.

Copolymers of two or more different conjugated dienes are also included within the scope of the present invention. These copolymers can be represented by structural Formula III

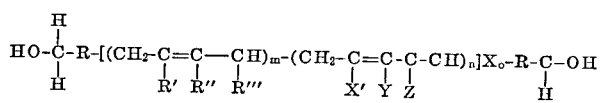

wherein R is as defined for structural Formula II and wherein R', R'', R''', X', Y, and Z are each selected from the identical groups given for R', R'', and R''' in Formula I above. The subscripts $m$, $n$, and $X_o$ are positive whole numbers. Since Formula III is representative of the copolymer of at least two different diene monomers, the unit

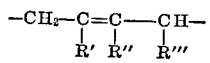

will be different from the unit

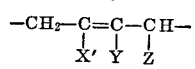

Thus R' will be different from X' and/or R'' will be different from Y and/or R''' will be different from Z. For example, in the copolymer of butadiene and isoprene, one of the units will be

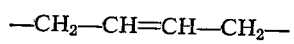

and the other

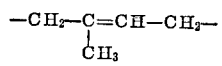

in the copolymer of chloroprene and isoprene, one unit will be

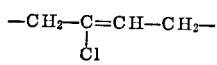

and the other

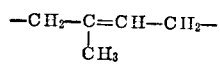

in the copolymer of butadiene and methylisoprene, one unit will be

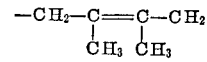

and the other $-CH_2-CH=CH-CH_2-$. It is apparent that hydroxymethyl-terminated polymers made from the copolymerization of three or even four different conjugated dienes can be made according to the process discussed hereinafter and are, therefore, within the broad scope of the invention. Nevertheless, copolymers of more than two different conjugated diene monomers are of little advantage, if any, over the copolymers of two such monomers. For this reason, the hydroxymethyl-terminated polymers made from one type of conjugated diene monomer (Formula II) and copolymers made from two different conjugated dienes (Formula III) represent the preferred embodiments of the invention.

In Formula III, the actual value of $m$ and $n$ and $X_o$ will depend on kinetics of the copolymerization reaction which, in turn, is dependent upon the particular pair of conjugated dienes selected. However, the 1,4-addition copolymerization of two different conjugated dienes is old in the art and requires no detailed discussion herein. The diene monomers react in the same manner to form the hydroxymethyl-terminated 1,4-addition polymers and copolymers of the present invention as they do in the formation of similar copolymers of the prior art, the biggest difference being that the particular free radical used to initiate the addition reaction results in terminal hydroxymethyl groups for each polymer chain. The value of $X_o$ should, however, be such that the resulting copolymer is a liquid within the temperature set forth above with those values which give a molecular weight of about 2,000 to about 10,000 being preferred and those values of $X_o$ which give a molecular weight of 3,000 to about 5,000 being especially preferred. Polymers and copolymers in the molecular weight of 2,000 to 10,000 are satisfactory for mixing with the solid ingredients of propellant mixes and those in the range of 3,000 to 5,000 are especially suitable for this application.

It is obvious to those skilled in the art that the numerical values of $m$, $n$, $x$, and $X_o$ cannot be controlled to the extent that each chain produced in a particular reaction will be the same. The polymers and copolymer will have an apparent or average molecular weight which is somewhere in value between that of the greatest and least individual molecular weight in the particular batch. However, the value of $m$, $n$, $x$, and $X_o$ for most of the individual polymeric chains will correspond closely to the values necessary to arrive at the average molecular weight of all the polymeric chains collectively.

The structural representation of the claimed compositions as presented in Formulas II and III indicates their basic chemical make-up. It is apparent that the polymer chain will actually be a combination of various cis and trans structural arrangements because of the double-bond in each unit. For example, the unit

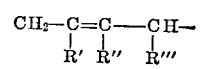

can exist as the cis form

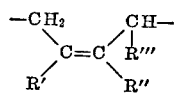

or as the trans form

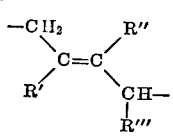

The amount of each isomeric form in a given chain is chiefly a function of the temperature at the time of polymerization. (Binder, Industrial and Engineering Chemistry, vol. 46, pp. 1727-1730.) In the polymeric chains of the instant invention the cis form constitutes about 8 to 20% of the total, the trans form about 55 to 70% of the total, and the remainder is vinyl addition form. The vinyl addition form is relatively constant, so the principal effect of increasing polymerization temperature is to shift the cis form to a higher percentage, and to lower the trans form in percentage. Synthesis of the polymer at 0° C. results in a chain containing about 8% of the cis form and about 70% of the trans form. Synthesis at 50° C. yields a chain containing about 20% of the cis form and about 55% of the trans form. Intermediate temperatures produce variations within these ranges.

The preferred hydroxymethyl-terminated polymers of the invention are those corresponding to Formula II wherein (1) R is pentamethylene and R', R'', and R''' are hydrogen and $x$ is a whole number from about 35 to about 175; (2) R is pentamethylene and R' is methyl and R'' and R''' are hydrogen and $x$ is a whole number of about 30 to about 150; (3) R is pentamethylene, R' is chloro, R'' and R''' are hydrogen, and $x$ is a whole number from about 25 to about 150. The single preferred polymer is that wherein R is pentamethylene and R', R'', and R''' are hydrogen and $x$ is a whole number in the range of 35 to 85 and which polymer corresponds to structural Formula II.

Copolymers representing preferred aspects of the invention are those hydroxymethyl-terminated copolymers corresponding to Formula III wherein:
(1) R', R'', R''', Y, and Z are hydrogen, and X' is methyl;
(2) R', R'', R''', Y, and Z are hydrogen, and X' is halogen (chlorine);
(3) R' is methyl, X' is chlorine, and R'', R''', Y, and Z are hydrogen.

It will be apparent that copolymers of the conjugated dienes and other ethylenically unsaturated monomers can also produce hydroxymethyl-terminated polymers. Particularly, the copolymers of these dienes (that is, butadiene, isoprene, chloroprene, and the like) with styrene or acrylonitrile having terminal hydroxymethyl groups are valuable as propellant binders. However, the copolymers of the dienes themselves are preferred.

Complete details for preparing the carboxy-terminated polymers and copolymers used as starting materials in the synthesis of the instantly claimed composition are given in copending application Ser. No. 224,570, filed Sept. 18, 1962, now Patent No. 3,393,289 of which applicant is a coinventor. The method by which these starting materials are transformed is discussed in detail in applicant's copending application Ser. No. 275,466, filed Apr. 24, 1963, now abandoned and its continuation-in-part application Ser. No. 335,440 filed Jan. 2, 1964 and now abandoned.

The following examples serve to better illustrate the present invention.

EXAMPLE 1

A carboxy-terminated polymer of butadiene is prepared from the ingredients set forth in Table 1 as indicated below.

TABLE 1

| | | |
|---|---|---|
| Distilled water | ml | 750 |
| Triton X-102 [1] | g | 19 |
| Benzene | ml | 50 |
| Butadiene (2.0 moles) | g | 108 |
| FeSO$_4$·7H$_2$O | moles | 0.15 |
| Cyclohexanone peroxide | do | 10.10 |

[1] Polyoxyethylated octyl phenol, Rohm and Haas Co.

An emulsion is prepared of all these ingredients except the cyclohexanone peroxide. The cyclohexanone peroxide is dissolved in 65 ml. of tetrahydrofuran and added to the emulsion at a uniform, dropwise rate over a three-hour period. The temperature of the emulsion is maintained at 0° C. due to the low boiling point of butadiene until completion of the polymerization reaction. At the end of three hours, the reaction mixture is acidified with hydrochloric acid to a pH of approximately 3 to insure complete conversion of all carboxy groups to the free acid. The reaction mixture is then extracted with chloroform. The chloroform extract containing the carboxy-terminated polymer is diluted with excess methanol to precipitate the polymer. After decanting, the polymer is again dissolved in choloroform which is subsequently removed under vacuum. The finished polymer is a clear viscous liquid having an average molecular weight of about 3300.

In the presence of the ferrous ion, cycloalkanone peroxides of the formula

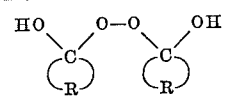

wherein the symbols R represent tetramethylene, pentamethylene, and hexamethylene (that is, cyclopentanone, peroxide, cyclohexanone peroxide, and cycloheptanone peroxide) undergo the following rearrangements, using cyclohexanone peroxide as an example:

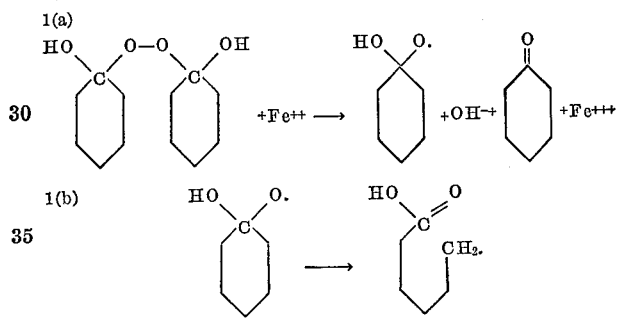

This free radical initiates and terminates the 1,4-addition polymerization reaction of the conjugated diene. Thus, the terminal groups on conjugated dienes polymerized in this manner correspond to the formula

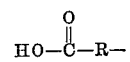

and the polymer would be of the type represented by

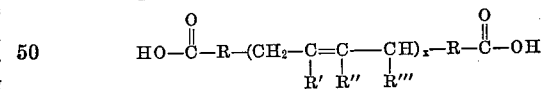

wherein R, R', R'', R''' and $x$ are as previously defined in relation to Formula II. In the same manner the carboxy-terminated copolymers of the conjugated dienes would correspond to the formula

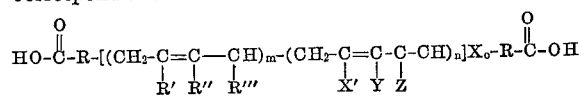

wherein R, R', R'', R''', X', Y, Z, and X$_0$ are as defined in relation to Formula III. Since cyclohexanone peroxide is the preferred cycloalkanone peroxide for use in the process, R is preferably pentamethylene.

The polymer produced at 0° C. contained about 70% of the trans-1,4 addition structure. If the temperature is increased to about 50° C. the resulting polymer or copolymer contains about 55% of the trans-1,4 addition structure. As previously mentioned, the low temperature is necessitated only by the low boiling points of the dienes to prevent undue loss of these reactants. When a diene having a higher boiling point (such as 1,3-hexadiene) is used the temperature can be raised without loss of the diene reactant. Moreover, the use of pressure permits the use of elevated temperatures without undue loss of the diene. For example, when Example 1 is repeated at 50° C. and 78 p.s.i.g., no noticeable loss of butadiene occurs and the finished polymer contains about 55% of the trans-1,4 addition structure. These polymers with more of the cis-1,4 addition structure are preferred as propellant binders.

If chloroprene or isoprene is used in lieu of the 1,3-butadiene of Example 1, the corresponding carboxy-terminated polymer of these monomers can be produced. Moreover, by substituting a mixture of at least two conjugated diene monomers for the single butadiene monomer, the corresponding carboxy-terminated copolymer can be synthesized.

The average molecular weight of the polymer or copolymer can be increased by slowing the addition rate of the cycloalkanone peroxide solution and decreased by increasing the addition rate of cycloalkanone peroxide solution.

EXAMPLE 2

Five-hundred grams of liquid carboxy-terminated polybutadiene prepared as in Example 1 (that is,

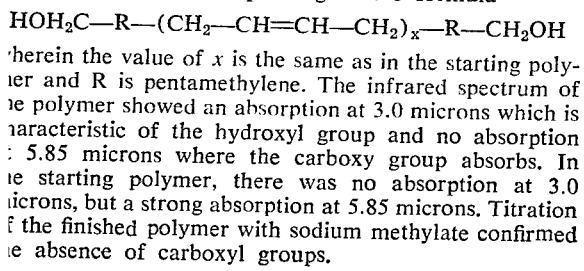

wherein $x$ is a whole number having a numerical value of about 57) containing 0.052 carboxy equivalents per 100 grams and 1.5% phenyl beta naphthylamine (an antioxidant) was diluted with 125 ml. of dry benzene. Thereafter, 25.0 grams of powdered LAH was dispersed in the polymer solution by thorough mixing. A solution of 75 ml. of tetrahydrofuran in 550 ml. of dry benzene was slowly added with vigorous stirring. The reaction mixture soon began to gel and in a few minutes substantially all the liquid had been converted to gel. This gel was heated for two hours at 140° F. to insure completion of the reaction, and then cooled to about 58° F.

Then the gel was cut into small pieces (about ½" cubes) and an aqueous d-tartaric acid solution (58% by weight d-tartaric acid) was added. The gel began to liquify in the acid solution, and as soon as it was sufficiently fluid, a mechanical stirrer was used to continue the mixing. Mixing was continued for 3 hours while the temperature of the mixture was maintained at 100° F. or lower (to control the speed of reaction) by circulation of cold water around the container. All the gel had been liquified at the end of the three hour period and 60 g. of a saturated aqueous sodium chloride solution was then added followed by another hour of stirring. The liquid was then filtered to remove all solids and the filtrate subjected to vacuum distillation at 25 inches of mercury and 80° F., leaving a clear, amber-colored liquid polymer. The LAH had reduced the terminal carboxy groups of the starting material to the hydroxymethyl group producing liquid polymer corresponding to the formula HOH$_2$C—R—(CH$_2$—CH=CH—CH$_2$)$_x$—R—CH$_2$OH wherein the value of $x$ is the same as in the starting polymer and R is pentamethylene. The infrared spectrum of the polymer showed an absorption at 3.0 microns which is characteristic of the hydroxyl group and no absorption at 5.85 microns where the carboxy group absorbs. In the starting polymer, there was no absorption at 3.0 microns, but a strong absorption at 5.85 microns. Titration of the finished polymer with sodium methylate confirmed the absence of carboxyl groups.

EXAMPLE 3

Ten grams of the polymer produced in Example 1 was mixed with 0.067 g. of trimethylol propane and 0.506 g. hexamethylene diisocyanate. After 3 days at 140° F., soft, slightly tacky rubber was obtained which had good strength and very high extensibility. The hardness, strength, and extensibility of rubbers made from this polymer are easily controlled by varying the amount of polyol added for crosslinking and adjusting the amount of diisocyanate accordingly. Further control can be gained with conventional plasticizer and fillers.

EXAMPLE 4

The procedure of Example is repeated using as a starting material a polymer of the formula

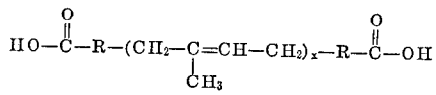

wherein R is pentamethylene and $x$ has an average whole number value of about 57. This starting material is prepared by substituting two moles of isoprene for the two moles of butadiene in Example 1. The product produced corresponded to the formula

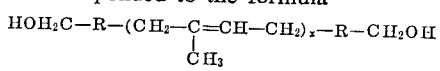

wherein $x$ and R are the same as in the starting material. Infrared analysis again showed an absorption at 3.0 microns and no absorption at 5.85 microns. Titration of the finished polymer with sodium methylate confirmed the absence of any carboxyl groups.

EXAMPLE 5

The procedure of Example 2 is repeated with a starting material produced as in Example 1 except that the cyclohexanone peroxide solution was added over a four-hour period. The resulting polymer exhibited the same infrared absorption as that in Example 2. The polymer was more viscous and had an average molecular weight of about 4,000.

EXAMPLE 6

Following the procedure of Example 2, a polymer of the formula

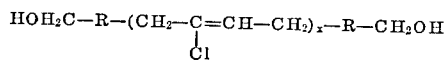

wherein $x$ has a value of about 36 and R is pentamethylene is prepared from the corresponding carboxy-terminated compound. The carboxy-terminated compound was prepared by substituting an equimolar amount of chloroprene for the butadiene of Example 1.

EXAMPLE 7

The process of Example 2 was repeated except that the starting material produced according to Example 1, was of a lower average weight since the cyclohexanone peroxide solution was added over a two-and-one-half hour period. The finished hydroxymethyl-terminated polymer had an average weight of about 2400.

EXAMPLE 8

The process of Example 2 was repeated except that the staritng material produced according to Example 1 was of a higher molecular weight since the cyclohexanone peroxide solution was added over a five hour period. The finished hydroxymethyl-terminated polymer had an average weight of about 6000.

EXAMPLE 9

The method of Example 1 was repeated except that the 108 g. of butadiene was replaced with one mole each of butadiene and isoprene. The carboxy-terminated polymer thus formed was converted to the corresponding liquid hydroxymethyl-terminated polymer according to the method of Example 2.

EXAMPLE 10

The method of Example 9 is repeated using a mixture of one mole of butadiene and one mole of chloroprene in lieu of the butadiene-isoprene mixture. A clear liquid hydroxymethyl-terminated butadiene-chloroprene copolymer is produced.

EXAMPLE 11

The method of Example 9 is repeated using a mixture of one mole of isoprene and one mole of chloroprene in lieu of the butadiene-isoprene mixture. The corresponding liquid hydroxymethyl-terminated isoprene-chloroprene copolymer is thereby produced.

The above discussion and examples are for the purpose of clarifying the invention, and no limitation of the invention is intended as a result thereof except as set forth in the appended claims.

I claim:
1. A substance selected from the group consisting of:
   (a) a liquid polymer of the formula

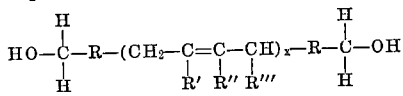

wherein $R'$, $R''$, and $R'''$ are each selected from the group consisting of hydrogen, lower alkyl, and halogen, R is a member selected from the group consisting of tetramethylene, pentamethylene, and hexamethylene, and $x$ is a positive whole number greater than one such that the molecular weight of said polymer is about 2,000 to about 10,000; and (b) a liquid copolymer of the formula

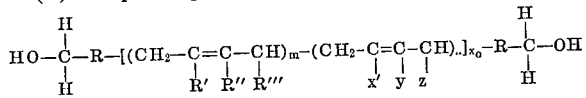

wherein R is a member selected from the group consisting of tetramethylene, pentamethylene and hexamethylene, $R'$, $R''$, $R'''$, $x'$, $y$, and $z$ are each a member selected from the group consisting of hydrogen, lower alkyl, therefore, halogen provided that the group

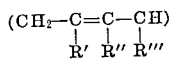

is different from the group

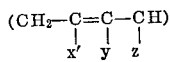

that the monomers of

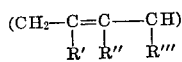

and

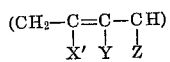

are randomly dispersed relative to each other in said copolymer, and $m$, $n$ and $x_0$ are positive whole numbers such that the molecular weight of said copolymer is about 2,000 to about 10,000.

2. The liquid polymer of the formula

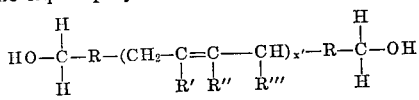

wherein $R'$, $R''$, and $R'''$ are each selected from the group consisting of hydrogen, lower alkyl, and halogen, R is a member selected from the group consisting of tetramethylene, pentamethylene, and hexamethylene, and $x'$ is a positive whole number greater than one such that the molecular weight of said polymer is about 2,000 to about 10,000.

3. The liquid copolymer of the formula

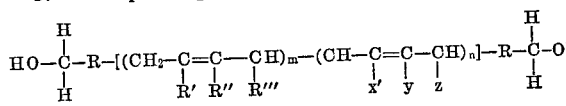

wherein R is a member selected from the group consisting of tetramethylene, pentamethylene and hexamethylene, $R'$, $R''$, $R'''$, $x'$, $y$, and $z$ are each a member selected from the group consisting of hydrogen, lower alkyl, and halogen provided that the group

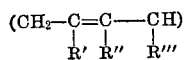

is different from the group

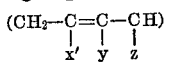

that the monomers of

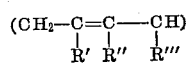

and

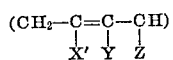

are randomly dispersed relative to each other in said copolymer, and $m$, $n$ and $X_0$ are positive whole numbers such that the molecular weight of said copolymer is about 2,000 to about 10,000.

4. A copolymer according to claim 2 wherein $m$, $n$, and $X_0$ are positive whole numbers such that the molecular weight of said copolymer is about 3,000 to about 5,000.

5. The liquid polymer of the formula

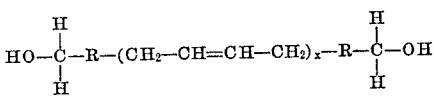

wherein $x$ is a positive whole number greater than one such that the molecular weight of said polymer is about 2,000 to about 10,000 and R is pentamethylene.

6. The polymer according to claim 5 wherein $x$ is a positive whole number greater than one such that the molecular weight of said polymer is about 3,000 to about 5,000.

7. The liquid polymer of the formula

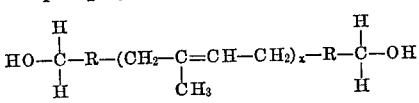

wherein $x$ is a positive whole number greater than one such that the molecular weight of said polymer is about 2,000 to about 10,000 and R is pentamethylene.

8. The polymer according to claim 7 wherein $x$ is a positive whole number of greater than one such that the molecular weight of said composition is about 3,000 to about 5,000.

9. The liquid polymer of the formula

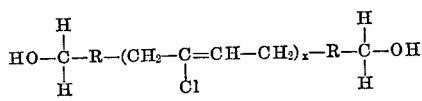

wherein $x$ is a positive whole number greater than 1 such that the molecular weight of said polymer is about 2,000 to about 10,000 and R is pentamethylene.

10. The polymer according to claim 9 wherein $x$ is a positive whole number greater than one such that the molecular weight of the polymer is about 3,000 to about 5,000.

References Cited

UNITED STATES PATENTS

| | | | |
|---|---|---|---|
| 2,811,551 | 10/1957 | Coffman et al. | |
| 3,293,289 | 12/1966 | Butler et al. | 260—533 |
| 2,662,914 | 12/1953 | Robeson | 260—635 |
| 2,757,210 | 7/1956 | Jenner | 260—635 |

LEON ZITVER, Primary Examiner.

J. E. EVANS, Assistant Examiner.

U.S. Cl. X.R.

149—19; 260—77.5, 615, 618, 613, 635